Feb. 3, 1925.
G. GUINTI ET AL
1,525,294
TANK INDICATOR
Filed Dec. 16, 1922
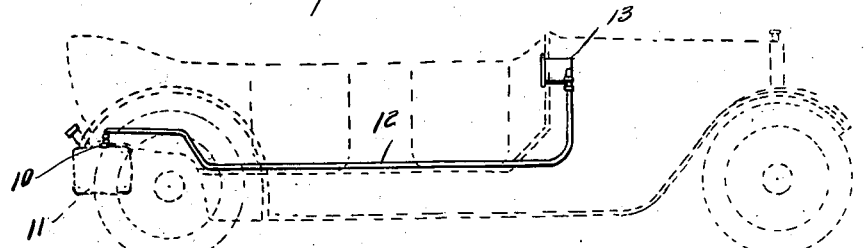
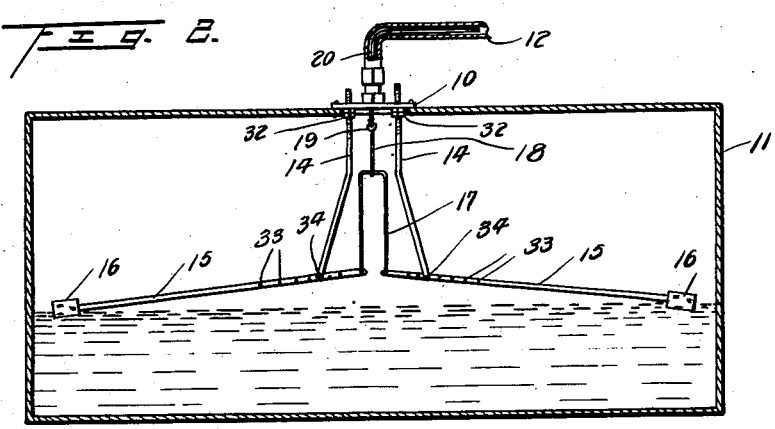
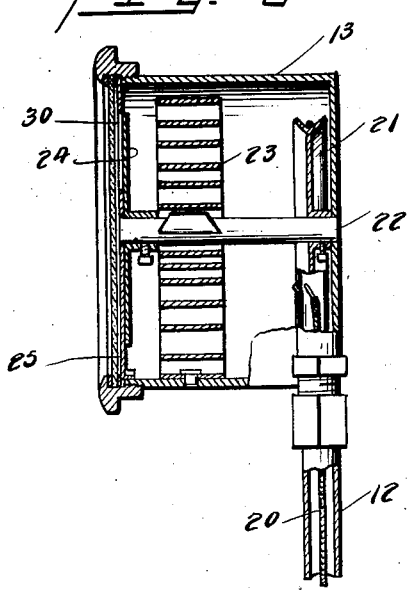
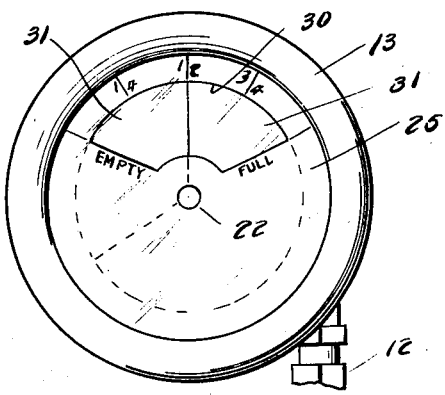
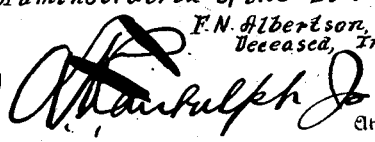

Patented Feb. 3, 1925.

1,525,294

UNITED STATES PATENT OFFICE.

GINO GUINTI, OF WEST HAVEN, CONNECTICUT, AND FLOYD N. ALBERTSON, DECEASED; BY ANNA M. ALBERTSON, ADMINISTRATRIX, OF BROOKLYN, NEW YORK.

TANK INDICATOR.

Application filed December 16, 1922. Serial No. 607,402.

*To all whom it may concern:*

Be it known that we, GINO GUINTI, a citizen of the United States, residing at West Haven, in the county of New Haven and State of Connecticut, and ANNA M. ALBERTSON, a citizen of the United States, residing in Brooklyn, in the county of Kings and State of New York, administratrix of the estate of FLOYD N. ALBERTSON, deceased, do hereby declare that FLOYD N. ALBERTSON and GINO GUINTI jointly invented certain new and useful Improvements in Tank Indicators, and do hereby further declare the following to be a full, clear, and exact description of the said invention, such as will enable others skilled in the art to which it appertains to make and use the same.

The object of the invention is to provide a simple and efficient means for use in connection with automobiles and similar motor driven vehicles for indicating the amount or supply of liquid fuel in the tank, and disclosing the indication under such conditions as to afford the driver of the vehicle the desired information at all times without leaving his station at the steering wheel; and with this object in view the invention consists in a construction and combination of parts of which a preferred embodiment is illustrated in the accompanying drawing, wherein:

Figure 1 is a side view of an apparatus embodying the invention applied in the operative position to a vehicle of which the outline is indicated, Figure 2 is a detail view in section of the tank equipment forming a part of the mechanism, Figure 3 is a similar view of the indicating devices, Figure 4 is a face view of the indicator.

The device consists essentially of a base or supporting plate 10 secured in any suitable manner to the fuel tank 11 and carrying one end of a tubular flexible guide 12 which is adapted to extend from the tank wherever it may be located on the vehicle to the dashboard or instrument board of the vehicle for connection with the casing 13 of the indicator which is preferably so located as to be within convenient view of the occupant of the driver's seat of the vehicle.

Depending from the supporting plate 10, within the tank are arms 14 upon which are pivotally mounted levers 15 carrying floats 16 adapted to be supported buoyantly by the liquid contents of the tank. Connecting the inner ends of the levers is a flexible loop 17 fitted with a runner 18 having an eye 19 which is engaged with the end of a chain or like tensile connection 20 extending through the tubular guide.

This tensile connection is reeled at its forward end upon a sprocket or chain wheel 21 having a spindle 22 to which is attached a retracting spring 23, said spindle being provided with an index disk 24 operating in connection with a gauge disk 25 which is fitted in the casing 13. The gauge disk is preferably provided with an opening 30 adjacent which may be arranged a graduated scale for indicating quantity or volume of liquid, and the indicator disk is provided with a colored segment 31 for inspection through the slot of the gauge disk, portions of said segment being colored contrastingly as in black and red with the division line between the same forming a pointer for traversing the scale of the gauge disk and thus indicating to the operator the approximate amount of fuel in the tank. The complete exposure of either of the contrastingly colored portions of the segments will indicate the tank is either full or empty, whereas the ratio of exposure of the contrastingly colored surfaces will indicate to the operator without reference to the graduations of the scale, the proportion of the contents of the tank to its capacity and therefore will serve as a warning to avoid completely exhausting the contents until a further supply can be obtained.

The device described can be readily applied to fuel tanks now in use without involving any material modification in the construction of such tanks and can be extended from the tank to the dash or instrument board and secured thereto likewise without material alteration in the machine or structure thereof, to the end that the operator of the car may be advised at all times of the condition of his supply of fuel.

The arms which depend from the supporting plate of the tank attachment are preferably threaded and engaged by nuts 32 to permit of vertical adjustment of the supporting pivots of the levers to suit different constructions of tanks, etc., and the levers are likewise provided with series of pivot openings 33 for selective engagement with the pivot pins 34 so as to vary the pivotal points of the levers and therefore the relative movements of the inner and outer ends of the lever to effect a desirable indicating movement of the indicator dial which is affected directly by the movement of said levers.

Having thus described the invention, what we claim is:—

A device of the class described having an indicator, a supporting plate, arms depending from the supporting plate, levers pivoted directly to said arms and carrying floats adjacent their outer ends, an inverted U-shaped loop disposed intermediate said arms and at its terminals respectively pivoted to said levers, and flexible means to actuate the indicator extending from said loop and through said plate.

In testimony whereof, we affix our signatures in presence of two witnesses.

GINO GUINTI.

Witnesses:
 ALFRED C. FUSCO,
 UMBERT FUSCO.

ANNA M. ALBERTSON,
*Administratrix of estate of Floyd N. Albertson, deceased.*

Witnesses:
 ETHEL M. RAWLINSON,
 GRACE S. HOLSTEN.